March 10, 1959
E. ROBINSON
2,876,978
SUPPORT BRACKETS
Filed April 4, 1956
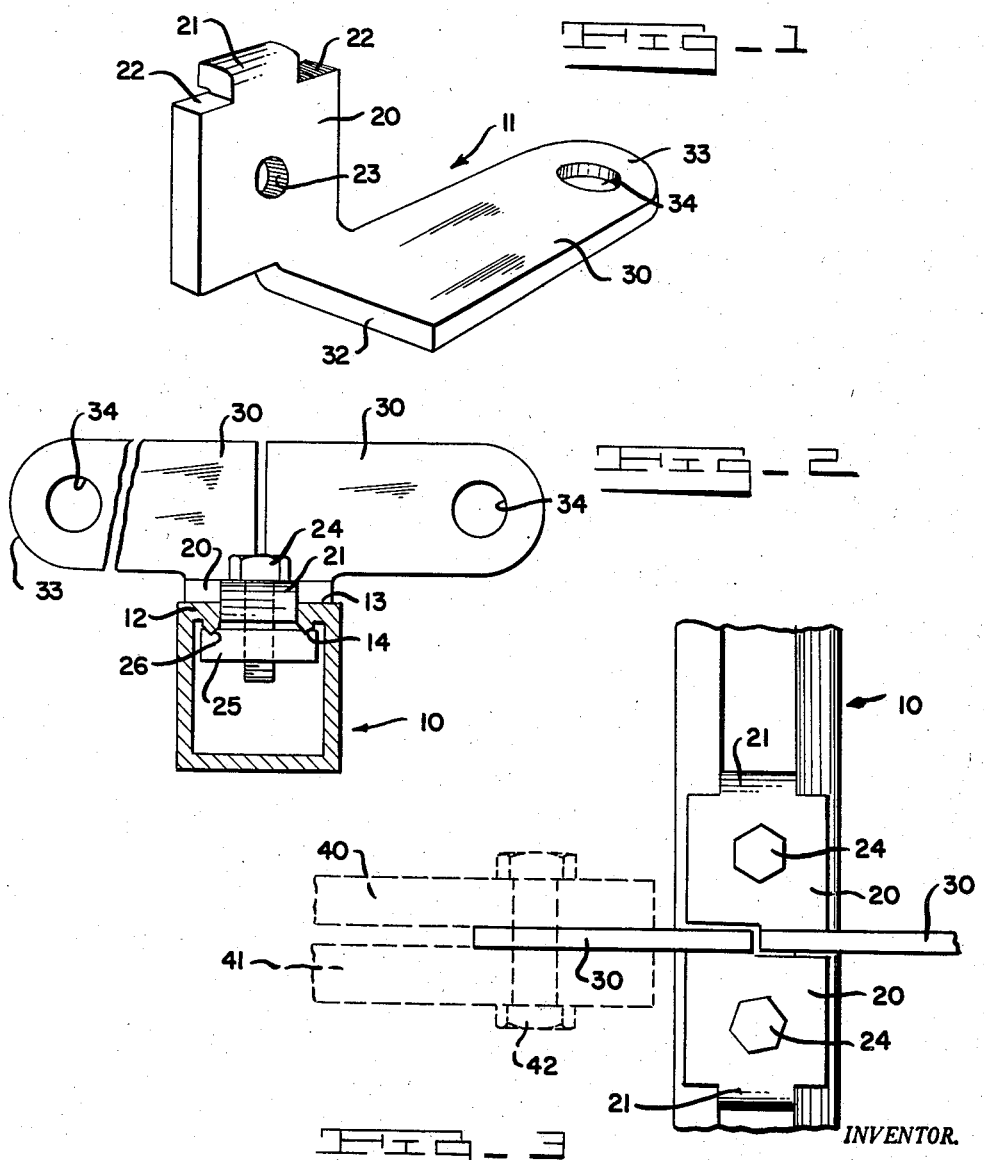
INVENTOR.
ELIOT ROBINSON
BY
Cullen & Cantor
ATTORNEYS

United States Patent Office 2,876,978
Patented Mar. 10, 1959

2,876,978

SUPPORT BRACKETS

Eliot Robinson, Birmingham, Mich.

Application April 4, 1956, Serial No. 576,061

4 Claims. (Cl. 248—245)

This invention relates to support brackets and more particularly to brackets adapted to be fastened to supporting columns for supporting shelving and framing and so forth.

It is an object of my invention to provide a support bracket which may be used in connection with supporting columns and wherein a supporting flange extends away from the bracket in one direction for supporting shelving or framing or other objects to be fastened to the supporting flange.

Another object of my invention is to provide a support bracket which may be used in pairs and wherein the supporting flange of each bracket are arranged co-planar.

Still another object of my invention is to provide a supporting bracket wherein a single form of the bracket may be used to provide a supporting shelf extending in one direction away from the supporting column or in the opposite direction away from the supporting column or in the alternative wherein a pair of supporting brackets may be used together to provide a co-planar pair of flanges for supporting objects such as shelving and the like within a single plane.

These and other objects of my invention will become apparent upon reading the following description of which the attached drawings form a part.

Referring to the drawings, in which:

Fig. 1 is a perspective view of the bracket, per se.

Fig. 2 is a view of the bracket mounted upon a support column with the column shown in cross-section and the bracket being shown in top view.

Fig. 3 is a front view of a pair of brackets as mounted upon the support column and with an object to be supported shown in dotted lines.

In the store fixture art as well as in the building and construction art, it is frequently necessary to provide brackets attached to vertical or even horizontal columns to which other members may be secured, such as shelving, for example. Thus, with reference to the drawings, I illustrate a supporting column of the hollow variety having a slotted longitudinal side generally designated as 10 to which I attach my novel support bracket 11. In this case, for illustrative purposes, I have chosen a support column which is substantially U-shaped or box shape in cross-section with a slotted end having opposed rails 12 which are spaced apart and which have an outer face 13 and an inner face or edge 14 on each one of the rails 12.

My supporting bracket which has been generally designated as 11 comprises the body member 20 which is formed of relatively thin metallic plate and which has one end bent into a tongue 21 extending substantially normal to the plane of the body member 20. It should be noted, that the tongue is centered relative to the body member and that the portions 22 on each side of the tongue are cut away for reasons to be explained below. This body member is apertured at 23.

To secure the bracket 11 to the support column, the body member 20 is rested in face to face contact with the outer faces 13 of the rails 12. The tongue 21 extends into the space between the rails 12 and is normally dimensioned to fit snugly within this space. In order to secure the body member 20 to the column 10, a bolt 24 is passed through the aperture 23 and is threadedly engaged with a nut 25.

In this particular example, the rails 12 are terminated into sharpened inner edges which are received by grooves 26 in the nut 25. This type of construction is desirable so that the nut will not rotate relative to the support column 10 and will remain in a fixed position. However, it can be seen that other types of nuts can be used and that the nut can be rested against a flat inner face of rails 12 rather than against a sharpened edge of the rails 12.

The bracket is arranged to support additional members and to secure these additional members to the supporting column 10 by means of a support flange 30 which is formed as an integral part of the body member 20. It is apparent that the flange may be made of a separate member, but it can be seen that for ease of construction and manufacturing, it is desirable to start with a single piece of flat plate stock and to bend the flat plate stock after die-cutting the plate stock into the shape shown in Fig. 1. The flange 30 extends away from the body member in a direction substantially normal to the plane of the body member although this may be varied somewhat depending upon what it is that is to be secured to the supporting flange.

As illustrated in the drawings, the supporting flange connects with only one-half of the lower edge of the body member or actually slightly less than one-half of the lower edge so that the end 32 of the flange 30 terminates sightly before the mid-point of the lower edge of the body member 20.

The flange 30 may be alongated in the direction of the plane of the body member 20 to form an edge 33 which extends considerably beyond the body member. Of course, the elongation need not be in the narrow form as shown in the drawing but may be more rectangular or squarish in form or may extend outwardly normal to the plane of the body member 20 a greater distance than the sidewise distance shown in Fig. 1.

In order to connect various objects to the supporting flange 30 an aperture 34 is provided. Thus, referring to Fig. 3 wherein objects 40, which may consist of flat boards for shelving or the like, are secured one on top and one underneath the flange 30 by means of a bolt passing through the aperture 34.

In normal usage, a single bracket may be used by connecting the bracket to the supporting column as indicated above and the flange 30 will extend in one direction to receive and support an object secured to the flange.

However, where it is desired to support such objects as shelving or supporting beams, or the like, two brackets may be used as a pair with one bracket having the body member extending upwardly and the other having the body member extending downwardly as shown in Fig. 3. In that case, the supporting flange 30 on one of the brackets extends in one direction and the supporting flange 30 of the other bracket extends in the opposite direction. The result is that the supporting flanges are co-planar and will support objects such as shelving or the like in a co-planar relationship. By means of terminating the flange 30 before or approximately at the mid-point of the lower end of the body member, it is only necessary to turn one of the flanges upside down in usage in order to align the flanges 30 of the two brackets.

This invention may be further developed within the scope of the following claims. Accordingly, it is desired that the foregoing description be read as being merely illustrative of one operative embodiment of my invention and not in a strictly limiting sense.

Having fully described an operative embodiment of my invention, I now claim:

1. A support bracket comprising a substantially rectangular shaped flat body member having a top edge, a bottom edge and side edges; a tongue bent from the top edge into a plane normal to the body member, with the tongue being considerably narrower than the body member and centered relative to the body member side edges so that the side edges of the tongue are spaced inwardly a considerable distance from the body member side edges; a support flange integral with and bent from the bottom edge and arranged perpendicular to the body member, with the support flange ending at a point approximately midway between the two side edges of the body member and being integral with the body member bottom edge only between said point and one of the body side edges, the flange extending a considerable distance beyond said one side edge of the body in a direction parallel to the plane of the body, whereby the bracket may be positioned upon a slotted tubular column with the tongue arranged in the column slot and the body member overlying the slot and in face to face contact with the slotted wall of the column at each side of the slot and the support flange arranged in front of the column and forming a support shelf arranged transverse to the axis of the column, and whereby the brackets may be used in pairs upon the column, with one bracket inverted relative to the other to align their support flanges in a single plane.

2. A construction as defined in claim 1 and wherein the body member is provided with a central opening through which a bolt may be inserted for bolting the body member to the column.

3. A support bracket bent of a single piece of flat metal and comprising three integral members, namely, a tongue member, a body member having end edges and side edges, and a support flange member, with the tongue member being integral with one end edge and the support flange member being integral with the other end edge of the body member, and with the tongue member and the support flange member each being bent perpendicular to the plane of the body member and extending in opposite directions therefrom to form a Z-shape; the support flange member terminating at approximately the center line of the body member between the two side edges of the body member to form an inner edge, and extending in a direction which is parallel to the plane of the body member towards one of the body member side edges and being integral with the body member end edge only between the center line and said one side edge, the remainder of the same end edge being free of any obstructions between the flange inner edge and the opposite body member side edge and being spaced a short distance away from the plane of the flange in a direction measured from the support flange member towards the edge of the body member with which the tongue is integral; the tongue member being considerably narrower than the body member and being centered relative to the body member and with the tongue member edges being spaced inwardly from the body member side edges a considerable distance, whereby when the bracket is inserted in a vertically arranged slotted tube having its forward wall slotted, the tongue member may be fitted inside the slot of the tube, the body member will overlie the slotted wall of the tube, and the support flange will be in front of the body member and well in front of the support, with the tongue member interlocking the support bracket to the support and with the support flange member forming a horizontal shelf extending laterally from the center of the body member to one side of the body member and whereby the brackets may be used in pairs upon the column, with one bracket inverted relative to the other to align their support flanges in a single plane.

4. A construction as defined in claim 3, and wherein the support flange member projects a considerable distance beyond said one side edge in a direction which is parallel to the plane of the body member, to thus project laterally a considerable distance to one side of the tube.

References Cited in the file of this patent
UNITED STATES PATENTS

| | | |
|---|---|---|
| 1,772,853 | Beardsley | Aug. 12, 1930 |
| 1,852,598 | Vogt | Apr. 5, 1932 |
| 1,863,565 | Davis | June 21, 1932 |
| 2,208,234 | Welch | July 16, 1940 |
| 2,263,282 | Welch et al. | Nov. 18, 1941 |
| 2,345,650 | Attwood | Apr. 4, 1944 |
| 2,453,007 | Flatt | Nov. 2, 1948 |
| 2,788,902 | Nowicki | Apr. 16, 1957 |